United States Patent
Roth et al.

(10) Patent No.: US 10,875,472 B2
(45) Date of Patent: Dec. 29, 2020

(54) ADD-ON ELEMENT, SYSTEM AND METHOD FOR PRODUCING AN ADD-ON ELEMENT

(71) Applicant: Bayerische Motoren Werke Aktiengesellschaft, Munich (DE)

(72) Inventors: Bruno Roth, Landshut (DE); Dienhung Huynh, Landshut-Auloh (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 134 days.

(21) Appl. No.: 16/193,750

(22) Filed: Nov. 16, 2018

(65) Prior Publication Data

US 2019/0084497 A1    Mar. 21, 2019

Related U.S. Application Data

(63) Continuation of application No. PCT/EP2017/060004, filed on Apr. 27, 2017.

(30) Foreign Application Priority Data

May 18, 2016   (DE) .......... 10 2016 208 515

(51) Int. Cl.
  *B60R 13/02*   (2006.01)
  *B60N 2/80*   (2018.01)
  (Continued)

(52) U.S. Cl.
  CPC .......... *B60R 13/02* (2013.01); *B60H 1/3407* (2013.01); *B60N 2/763* (2018.02); *B60N 2/80* (2018.02);
  (Continued)

(58) Field of Classification Search
  CPC . B60R 13/02; B60R 13/0206; B60R 13/0256; B60R 13/0262;
  (Continued)

(56) References Cited

U.S. PATENT DOCUMENTS 2,932,825 A * 4/1960 Vaughan, Jr. ........ G01N 33/085
                                             198/803.8
4,619,478 A * 10/1986 Heimnick ................ B60N 2/78
                                             296/153
(Continued)

FOREIGN PATENT DOCUMENTS

CN       100374740 C     3/2008
DE       103 56 460 A1   7/2005
(Continued)

OTHER PUBLICATIONS

German-language Search Report issued in counterpart German Application No. 10 2016 208 515.8 dated Jan. 13, 2017 (five (5) pages).

(Continued)

*Primary Examiner* — Gregory A Blankenship
(74) *Attorney, Agent, or Firm* — Crowell & Moring LLP

(57) ABSTRACT

An add-on element for adding onto a passenger-compartment component of a motor vehicle includes a basic body composed of a flexible first material, and at least one actuator body composed of a flexible second material. The at least one actuator body is deformable by being acted upon with an actuator source. The basic body has at least one receiving region with a receiving-region shape, wherein the at least one actuator body is arranged in the at least one receiving region. By way of a change in shape of the at least one actuator body, the receiving-region shape of the at least one receiving region can be changed.

16 Claims, 5 Drawing Sheets

(51) Int. Cl.
   *B60N 2/90*    (2018.01)
   *B60N 3/10*    (2006.01)
   *B60N 2/806*   (2018.01)
   *B60H 1/34*    (2006.01)
   *B60N 2/75*    (2018.01)
   *B33Y 80/00*   (2015.01)

(52) U.S. Cl.
   CPC ............ *B60N 2/806* (2018.02); *B60N 2/914* (2018.02); *B60N 3/105* (2013.01); *B33Y 80/00* (2014.12); *B60H 2001/3471* (2013.01); *B60R 2013/0281* (2013.01); *B60R 2013/0287* (2013.01)

(58) Field of Classification Search
   CPC ..... B60R 2013/0287; B60R 7/06; B60R 7/04; B60N 2/763; B60N 2/77; B60N 2/773; B60N 2/777; B60N 2/914; B60N 3/105; B60N 3/106; B60N 3/108; B60H 1/3407
   See application file for complete search history.

(56) References Cited

U.S. PATENT DOCUMENTS

| | | | | |
|---|---|---|---|---|
| 5,704,579 | A * | 1/1998 | Celentino | B60N 3/101 248/311.2 |
| 5,816,645 | A * | 10/1998 | Grimes | B60N 2/78 296/153 |
| 5,967,594 | A * | 10/1999 | Ramanujam | B60R 21/0428 296/153 |
| 6,302,364 | B1 | 10/2001 | Chiueh | |
| 6,787,007 | B2 * | 9/2004 | Lessing | F17C 1/16 204/242 |
| 6,910,714 | B2 * | 6/2005 | Browne | B60R 21/04 280/753 |
| 7,264,271 | B2 * | 9/2007 | Barvosa-Carter | B60R 21/04 280/751 |
| 7,758,121 | B2 * | 7/2010 | Browne | B60R 7/043 297/284.11 |
| 7,963,602 | B2 * | 6/2011 | Spahn | B60N 2/0276 297/216.13 |
| 9,180,830 | B1 * | 11/2015 | Faruque | B60R 13/0243 |
| 10,259,370 | B2 * | 4/2019 | Filipovich | B60R 11/00 |
| 10,315,551 | B2 * | 6/2019 | Filipovich | B60N 3/106 |
| 2005/0081711 | A1 | 4/2005 | Kerekes et al. | |
| 2005/0205739 | A1 * | 9/2005 | DePue | B60N 3/108 248/311.2 |
| 2006/0125291 | A1 | 6/2006 | Buravalla et al. | |
| 2006/0163933 | A1 * | 7/2006 | Radu | B60N 2/767 297/411.35 |
| 2006/0238066 | A1 | 10/2006 | Pelrine et al. | |
| 2008/0272259 | A1 * | 11/2008 | Zavattieri | B60N 3/12 248/311.2 |
| 2009/0096251 | A1 * | 4/2009 | Niezur | F16F 1/3737 296/187.02 |
| 2013/0125350 | A1 * | 5/2013 | Poulakis | B60R 13/0206 24/306 |
| 2018/0321703 | A1 * | 11/2018 | Gandhi | B60R 13/00 |
| 2018/0361897 | A1 * | 12/2018 | Lem | B60N 2/646 |
| 2019/0084497 | A1 * | 3/2019 | Roth | B60N 2/763 |
| 2019/0255948 | A1 * | 8/2019 | Dinant | B60K 37/02 |
| 2020/0122650 | A1 * | 4/2020 | Habert | B60R 13/0237 |

FOREIGN PATENT DOCUMENTS

| | | |
|---|---|---|
| DE | 10 2004 059 874 A1 | 6/2006 |
| DE | 11 2005 003 048 T5 | 12/2007 |
| DE | 600 37 433 T2 | 12/2008 |
| DE | 10 2015 012 339 B3 | 10/2016 |
| EP | 1 865 208 A2 | 12/2007 |
| GB | 2 343 430 A | 5/2000 |

OTHER PUBLICATIONS

International Search Report (PCT/ISA/210) issued in PCT Application No. PCT/EP2017/060004 dated Aug. 9, 2017 with English translation (five (5) pages).

German-language Written Opinion (PCT/ISA/237) issued in PCT Application No. PCT/EP2017/060004 dated Aug. 9, 2017 (four (4) pages).

Chinese-language Office Action issued in Chinese Application No. 201780010259.6 dated Apr. 2, 2020 with English translation (12 pages).

* cited by examiner

ADD-ON ELEMENT, SYSTEM AND METHOD FOR PRODUCING AN ADD-ON ELEMENT

CROSS REFERENCE TO RELATED APPLICATIONS

This application is a continuation of PCT International Application No. PCT/EP2017/060004, filed Apr. 27, 2017, which claims priority under 35 U.S.C. § 119 from German Patent Application No. 10 2016 208 515.8, filed May 18, 2016, the entire disclosures of which are herein expressly incorporated by reference.

BACKGROUND AND SUMMARY OF THE INVENTION

The present invention relates to an add-on element for adding onto an interior component of a motor vehicle. In addition, the invention relates to a system for an interior of a motor vehicle having an add-on element according to the invention. Finally, the invention relates to a method for producing an add-on element according to the invention.

Modern motor vehicles have an interior surrounded by interior components, such as for example a body, console panels, trim elements or the like, wherein the surfaces of the interior components bounding the interior and facing the latter often have a decorative surface or a lamination, for example a thin layer of natural material, plastics, leather or the like to improve the look, feel, smell, vibration or sound damping and/or for protection against external influences. Interior components can, for example, include metals, plastics, natural fiber composite materials or the like.

Furthermore, add-on elements are often arranged on such internal components, for example fulfilling technical functions, such as guiding an air stream from an air conditioning system into the interior, holding a beverage cup, covering a storage compartment, providing an armrest or the like. Add-on elements of this type often have a relatively rigid basic body, which can be movably attached to any interior component via a mounting, for example so as to be pivotable about at least one axis. Add-on elements of this type have the disadvantage that, because of the rigid formation, they have very little variability and are difficult to adapt to variable requirements on an interior design, for example because of a change of driver, changed demands of the occupants of the motor vehicle, changed operating situation of the motor vehicle or the like. In addition, many add-on elements, such as ventilation slots for an outlet of an interior air conditioning system, have a complex structure and are therefore often particularly complicated to assemble. As a result, in addition to a high number of parts, highly complex assembly and high production costs arise.

Moreover, so-called intelligent or adaptive material systems are known, which can change shape as a result of manipulation controlled from outside, for example by applying an electrical voltage or changing an internal air pressure. By means of a specific configuration of these materials and deliberate manipulation, specific shape changes can thus be effected. Known materials are, for example, dielectric elastomers, with which shape changes of up to 300% can be achieved. Dielectric elastomers belong to the group of electro-active polymers, in which a shape change can be effected by applying an electric voltage. Thus, with a dielectric elastomer, electric energy can be converted directly into mechanical work.

In principle, dielectric polymers have two flat electrode layers at a distance from each other with an intermediate layer of a particularly extensible elastomer as dielectric. The electrode layers have a relatively high flexibility, in order to not impede surface expansions. As a result of applying an electric voltage to the electrode layers, these attract one another on account of the different charges, which means that the intermediate layer is compressed and expands in a direction transverse to the attraction force of the electrode layers. This shape change of the elastomer is based on incompressibility, so that the volume of the elastomer remains constant irrespective of the pressure of the electrode layers. When the voltage is removed, the elastomer returns into its initial state again. Dielectric polymers are already used, for example to produce actuators or sensors. Material systems of this type are currently very expensive to produce and thus costly.

It is therefore an object of the present invention to eliminate or at least partly eliminate the above-described disadvantages in an add-on element for adding onto an interior part of a motor vehicle, a system for an interior of a motor vehicle and a method for producing an add-on element according to the invention. In particular, it is an object of the present invention to devise an add-on element for adding onto an interior component of a motor vehicle, a system for an interior of a motor vehicle and a method for producing an add-on element which improve a functional interior design of a motor vehicle in a simple and economical way.

These and other objects are achieved by an add-on element for adding onto an interior component of a motor vehicle, a system for an interior of a motor vehicle, and by a method for producing such an add-on element in accordance with embodiments of the invention. Here, features and details which are described in connection with the add-on element according to the invention of course also apply in connection with the system according to the invention and the method according to the invention and respectively vice versa, so that with respect to the disclosure relating to the individual aspects of the invention, reference is or can always be made reciprocally.

According to a first aspect of the invention, the object is achieved by an add-on element for adding onto an interior component of a motor vehicle. The add-on element has a basic body made of a first material and at least one actuator body made of a second material, wherein the at least one actuator body is reversibly deformable by applying an actuator means. Furthermore, the basic body has at least one receiving region having a receiving region shape, wherein the at least one actuator body is arranged in the at least one receiving region. As a result of a shape change of the at least one actuator body, the receiving region shape of the at least one receiving region can be changed.

An interior component can, according to the invention, be a body component, for example, a trim element, such as a body trim, a console panel, a dashboard panel, a ventilation outlet or the like.

An add-on element, according to the invention, can be a trim element, for example, such as a body trim, a console panel, a dashboard panel, a ventilation outlet or the like. Accordingly, add-on elements are design elements relating to design of the interior and can accordingly provide different technical functions, such as covering regions, such as body components or compartments, guiding or controlling a ventilation air stream, etc. The add-on element is preferably flat or substantially flat. In addition, provision can be made for the add-on element to have contours, such as ledges, slots, edges, corners, rounded portions or the like. The add-on element can, for example, already have a concrete shape in an unstressed state, such as that of an armrest, and be deformable into another concrete shape by deformation.

The basic body preferably has inherent two-dimensional stability, so that it does not deform or is not deformable or is only slightly deformed or can be deformed only slightly without any external action, and thus ensures a basic stability of the add-on element. This can also be ensured, for example, in conjunction with the further components of the add-on element, such as the actuator body and/or an optional encapsulation made of a flexible material. An at least slight flexibility of the basic body may be advantageous, in order to permit a shape change of the add-on element. A shape change of the basic body can be achievable, for example, by means of coupling elements, such as hinges, ball joints or the like of the basic body, via which preferably inflexible basic body elements of the basic body are coupled pivotably to one another. Preferred materials for the basic body are, for example, polypropylene (PP), acrylonitrile butadiene styrene (ABS), polycarbonate (PC), polyamide (PA) or the like.

The actuator body is designed to deform reversibly, preferably flexibly, in a reaction to an application of an actuator means or a change in an application with the actuator means. A reversible deformation is understood to mean a deformation which can be achieved repeatably between at least two deformation states. This is the case, for example, in flexible deformation. Preferred materials for the actuator body are, for example, thermoplastic elements (TPE), in particular styrene ethylene butylene styrene (SEBS), thermoplastic polyurethanes (TPU), thermoplastic polyolefins (TPO) or the like. The second material is preferably matched to the first material, in order to improve or to effect adhesion between basic body and actuator body. In the case of a first material made of PP, a second material is made of SEBS, for example; in the case of a first material made of PA, for example a second material made of TPU or adhesion-modified ABS is preferred.

According to the invention, provision can be made for the first material to correspond to the second material. Here, the basic component can be formed, for example, as an injection molded component and the actuator body as a 3-D printed component. It is also possible for both basic component and actuator body to be formed as a 3-D printed component. In this case, the 3-D printed component has a basic component region and actuator body regions.

The basic body has at least one receiving region with a receiving region shape. The receiving region is preferably bounded in at least two opposite directions by receiving walls. The receiving region is formed as a cavity, for example, which is preferably open to the outside on one side.

The at least one actuator body is arranged in the at least one receiving region. It is preferred if the actuator body fills or substantially fills the receiving region. Particularly preferably, the actuator body rests on the receiving walls on both sides which bound the receiving region at the side in two opposite directions or is adjacent to the latter, in such a way that, even with a relatively low shape change of the actuator body, the latter can be brought into contact with the receiving walls. Provision can be made, for example, for the actuator body to rest on multiple receiving walls and/or to be fixed to at least one receiving wall, for example by adhesion.

By acting on the actuator body, a shape change of the actuator body is achievable. On account of this shape change, it is possible to produce such a pressure between actuator body and receiving walls in order to effect a shape change of the receiving region shape of the receiving region. In this way, deformation of the basic body can be effected.

Preferably, the basic body is at least partly enclosed by a flexible material, in order to improve cohesion of basic body and actuator body and/or to protect the add-on component against external influences and/or to improve the look, feel or the like.

As compared with conventional add-on elements, the present add-on element has the advantage that a flexible and variable add-on element which is designed to execute a plurality of different technical functions is provided with simple means and economically. Depending on the number, formation and arrangement of the actuator bodies and receiving regions, even very complex shape changes of the basic body can be effected. The add-on element can, for example, be formed as a variable cup holder, adjustable ventilation slot cover, adjustable armrest, adjustable cover, adjustable head rest or the like. By means of specific application of the actuator means, the add-on element can be adapted very variably to the requirements of the occupants of the motor vehicle.

It is preferred for the basic body to have a plurality of receiving regions, wherein the receiving regions in one section of the basic body are formed at least on two different or opposite sides of the basic body. The more receiving regions there are, the more complex are the possibilities of the shape change. Depending on an arrangement and formation of the receiving regions, possible directions of the shape changes can be defined. The formation of the receiving regions on opposite sides has the advantage that deformability in opposite directions is improved. This is advantageous, for example, for use as an air grille.

Further preferably, the basic body has a wave-like cross section, at least in some areas. According to the invention, a wave shape is understood to mean a sine curve, a square-wave curve and a mixture of these curves. It is preferable if a receiving chamber shape corresponds or at least substantially corresponds to a basic body shape of a section of the basic body. Basic bodies of this type can be produced with simple means and economically, for example by an injection molding process or on a 3-D printer.

According to the invention, provision can be made for the basic body to have a plurality of receiving regions, wherein the receiving regions in one section of the basic body are formed substantially on the same side of the basic body. The more receiving regions there are, the more complex are the possibilities of the shape change. Depending on an arrangement and formation of the receiving regions, possible directions of the shape changes can be defined. Forming the receiving regions on the same side has the advantage that more intense deformability of the add-on element in one direction is achievable. This is advantageous, for example, for use as a flap for a compartment.

Further preferably, the basic body has a comb-like cross section, at least in some areas. With a comb-like cross section, the receiving regions are preferably open in a common direction or in a substantially common direction. Basic bodies of this type can be produced with simple means and economically, for example by an injection molding process or on a 3-D printer.

In an advantageous refinement of the invention, provision can be made in an add-on element for the at least one receiving region to have a substantially triangular, rectangular, trapezoidal, round or oval cross section. According to the invention, provision can be made for the receiving region to have an undercut, in order to improve retention of the actuator body in the receiving region and/or to enlarge an extent of deformability of the basic body by the actuator body since the compressive force can thus be transmitted to the receiving walls via a greater shape change travel of the actuator body. Basic bodies of this type can be produced in particular with a 3-D printer.

According to a preferred development of the invention, in an add-on element the at least one receiving region has receiving walls and at least one functional wall formed differently from the receiving walls. A functional wall can, for example, provide a contact surface of the actuator body, in order to position the latter specifically within the receiving region and/or to change, in particular to improve, the deformability of the basic body, at least partly.

It is preferred for the functional wall to have a hollow space, in particular with a rectangular, trapezoidal or oval cross section. According to the invention, the hollow space can also be filled or at least partly filled with a medium, such as air, foam, an elastomer or the like. The functional wall can thus, for example, be formed as a double wall with an interspace. Here, it is preferred if a wall of the functional wall that faces the actuator body has a lower lateral form than a wall of the functional wall facing away from the actuator body. This has the advantage that a shape change of the basic body is hindered less by the functional wall.

Preferably, electric current or a pressurized fluid, in particular compressed air, can be used as actuator means. Actuator means of this type are easily and economically controllable with simple technical means. An actuator body which is designed for the application of a pressurized fluid can be formed for a single-axis or multi-axis shape change or expansion. In the case of a single-axis shape change, the actuator body can, for example, be a pressure shell, pressure cage, pressure plates or the like which permit a shape change along only one axis.

According to an advantageous development of the invention, provision can be made in an add-on element for the actuator body to be a closed body and to have at least one interface for the flow of pressurized fluid into and/or out of the actuator body. Thus, the ability to apply pressurized fluid to the actuator body with simple means is ensured, and an unintended escape of the pressurized fluid out of the actuator body is preventable.

It is preferred for the first material to have a higher stiffness than the second material. This has the advantage that the add-on element has a higher basic stiffness and less energy is required for the shape change of the actuator means. Restoring the add-on element into a basic position, in which the actuator body does not have an actuator means applied, is thus improved with simple means.

According to a second aspect of the invention, the object is achieved by a system for an interior of a motor vehicle. The system has at least one add-on element according to the invention, a providing device for providing the actuator means, at least one line element for guiding the actuator means between the providing device and the at least one add-on element and a control unit for the open-loop and/or closed-loop control of the providing device.

The providing device for providing the actuator means can be formed, for example, as a voltage source, compressed air compressor or the like. The line element can be formed, for example, as a power cable or compressed air hose. By means of the control unit, the shape change of the add-on element is controllable. At least one sensor can be provided, which is designed to determine information about a deformation state of the add-on element and pass on this information to the control unit.

The system according to the invention has the same advantages as have already described above with respect to the add-on element according to the invention. By means of the system according to the invention, a flexible and variable design of add-on elements in the interior of the motor vehicle is provided with simple means and economically.

Preferably, the system has at least one operating element for operating the control unit. The operating element is coupled to the control unit and is designed for the input of control commands, such as an adjustment of a ventilation slot, the movement of a flap or the like, to the control unit. Additionally or alternatively, a display unit or display interface can be provided in order to display a state of the add-on element.

According to a third aspect of the invention, the object is achieved by a method for producing an add-on element according to the invention. The method has the following steps:

producing a basic body from a first material, wherein the basic body has at least one receiving region with receiving walls, introducing a free-flowing second material into the at least one receiving region to produce an actuator body, and solidifying edge zones of the second material.

The production of the basic body can be carried out, for example, in an injection molding process or by means of an additive process, such as a 3-D printing process. The first material is preferably polypropylene (PP), acrylonitrile butadiene styrene (ABS), polycarbonate (PC), polyamide (PA) or the like. Preferably, the basic body has a multiplicity of receiving regions. The free-flowing second material is then introduced into the at least one receiving region, preferably into multiple receiving regions, of the basic body, for example sprayed in or printed. Provision can be made for the second material to be foamed on in the receiving region. Edge zones of the second material are solidified or rigidified first, while in the core region a certain free-flowing property is at least initially maintained. Here, solidification is understood to mean that in this region there is greater coherence of the second material, which prevents or substantially prevents flowing of these regions. Via a deformation of the actuator body, the receiving region and thus the basic body is elastically deformable. Such a deformation of the actuator body is, for example, by means of the use of an electroactive polymer as second material. A deformation is thus achievable by applying a voltage to the actuator body.

The method according to the invention has the same advantages as have already described above with respect to the add-on element according to the invention and the system according to the invention. By means of the method according to the invention, economical production of an add-on element according to the invention which is designed to execute a plurality of different technical functions is made possible with simple means and economically. Depending on the number, formation and arrangement of the actuator bodies and receiving regions, even very complex shape changes of the basic body can be effected. The add-on element can be formed, for example, as a variable cup holder, adjustable ventilation slot cover, adjustable armrest, adjustable cover, adjustable head rest or the like.

According to the invention, provision can be made for at least part of the free-flowing second material (W2) to be driven out of the receiving region (4) in such a way that at least one continuous cavity (16) surrounded by the solidified edge zones (15) is formed, the expulsion being carried out by a pressurized fluid, in particular compressed air, and/or by means of a dissolved propellant. During the expulsion, at least part of the free-flowing second material from the core region is driven out of the receiving region and thus removed. In this way, a continuous cavity is formed in the second material. By applying an actuator source to the cavity, such as a pressurized fluid or the like, it is possible to generate a pressure within the cavity, by which the actuator body can be deformed elastically. Via this deformation of the actuator body, the receiving region and thus the basic body can be deformed elastically. This has the advantage that controllability of the actuator body is achievable with simple means. The dissolved propellant is designed to foam a plastic core when pressure is relieved and, to produce the continuous channel when still further volume is exposed by breaking up the foam. This has the advantage that no further medium and no expulsion of the material are necessary. Alternatively or additionally, given partial adhesion between the first material and the second material, the channel can also be deformed by applying a pressurized fluid to these non-adhering interfaces. Interfaces of this type are, for example, by masking and pretreatment, such as for example flame-treatment, plasma or the like, or by the application of a release agent between the basic body and the actuator body.

Other objects, advantages and novel features of the present invention will become apparent from the following detailed description of one or more preferred embodiments when considered in conjunction with the accompanying drawings.

DETAILED DESCRIPTION OF THE DRAWINGS

Elements with the same function and mode of action are each provided with the same designations in FIGS. 1 to 5. Of the add-on elements 1, only one section is depicted in each case, wherein the add-on elements 1 can be formed as an endless component which, for example, can be wound up onto a roll.

Figure 1A:
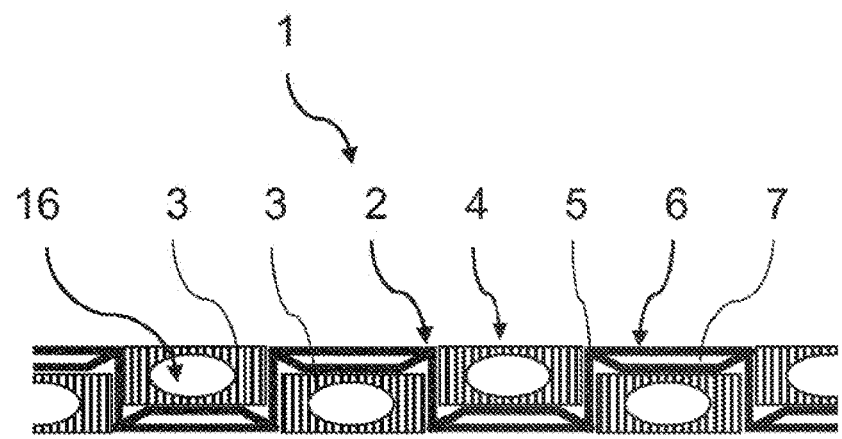
FIG. 1A shows a side view of a first embodiment of an add-on element according to the invention.

A first embodiment of an add-on element 1 according to the invention is depicted schematically in a side view in FIG. 1A. The add-on element 1 has a basic body 2 with a cross section which corresponds substantially to a rectangular profile. The basic body 2 has receiving walls 5 and functional walls 6, by which the receiving regions 4 are defined with a substantially rectangular cross section, wherein the receiving walls 5 bound the receiving regions 4 laterally, and the functional walls 6 each provide a base wall of the receiving regions 4, which are each arranged between two receiving walls 5. The functional walls 6 in this example are formed as a double wall with a hollow space 7 formed in between, wherein a wall arranged toward the interior of the receiving region 4 is shorter than a wall arranged toward the outside, so that the functional walls 6 have a trapezoidal cross section. In this way, deformability of the add-on element 1 is improved. Alternatively, the hollow space 7 can have a core, in particular a foam core or one or more sandwich layers made of different materials.

The receiving regions 4 are arranged to be uniformly distributed beside one another, adjacent receiving regions 4 being open in opposite directions. An actuator body 3 is arranged in each of the receiving regions 4. As a result of the functional wall 6, the receiving regions 4 are reduced in size on one side, so that the adjacent actuator bodies 3 have an offset relative to one another. In this way, deformability of the add-on element 1 is improved. The actuator body 3 has a central cavity 16, which can be acted on by an actuator source, such as compressed air, a pressurized fluid or the like. As a result of this application, the actuator body 3 is expandable, and this expansion can be transmitted to the basic body 2, so that the add-on element 1 can thus be deformed specifically. Such a formation is particularly suitable for functional components which are intended to have good deformability in two opposite directions, such as ventilation slot grilles. Provision can be made for the first embodiment to have a matrix material M (cf. FIG. 2E), in which the basic body is embedded with the actuator bodies. The matrix material can be formed, for example, to achieve a visual and/or haptic effect.

Figure 1B:
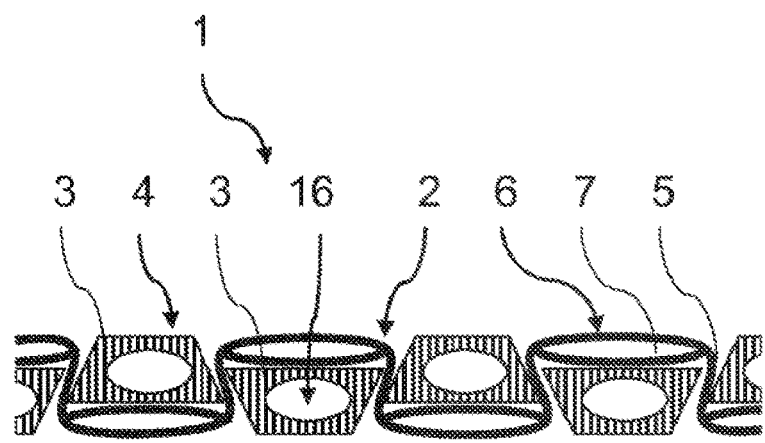
FIG. 1B shows a side view of a second embodiment of an add-on element according to the invention.

A second embodiment of an add-on element 1 according to the invention is depicted schematically in a side view in FIG. 1B. The second embodiment differs from the first embodiment in particular in a formation of the basic body 2 and of the actuator bodies 3. The basic body 2 substantially has a wave-like and the actuator bodies 3 a trapezoidal cross section, wherein the receiving regions 4 have undercuts, behind which the actuator bodies 3 engage and are thus held better on the basic body 2. A cross section of the hollow spaces 7 of the functional walls 6 is oval in this example. Provision can be made for the second embodiment to have a matrix material M (cf. FIG. 2E), in which the basic body is embedded with the actuator bodies.

Figure 1C:
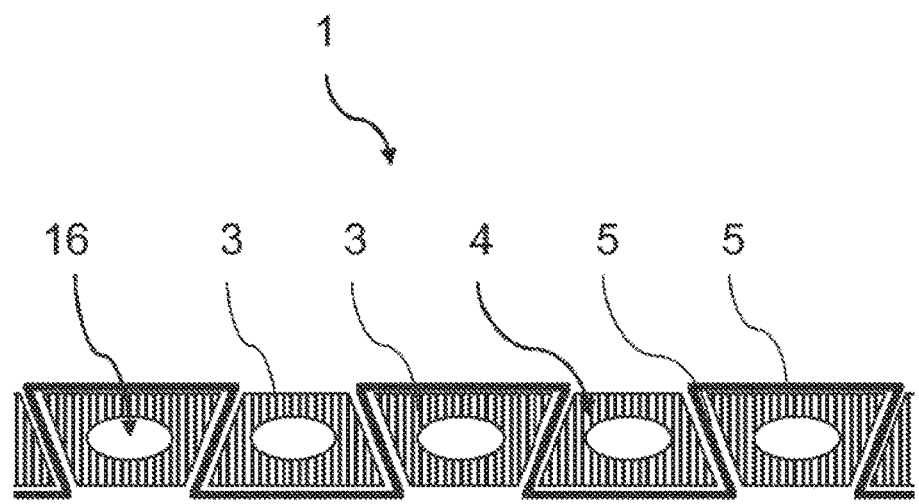
FIG. 1C shows a side view of a third embodiment of an add-on element according to the invention.

A third embodiment of an add-on element 1 according to the invention is depicted schematically in a side view in FIG. 1C. The third embodiment differs from the first embodiment in particular in a formation of the basic body 2 and of the actuator bodies 3. The basic body 2 substantially has a sawtooth-like cross section, the receiving regions 4 and the actuator bodies 3 having a trapezoidal cross section. The receiving regions 4 have undercuts, behind which the actuator bodies 3 engage and are thus held better on the basic body 2. The add-on element 1 according to the third embodiment has a conventional receiving wall 5 instead of a functional wall 6. Provision can be made for the third embodiment to have a matrix material M (cf. FIG. 2E), in which the basic body is embedded with the actuator bodies.

Figure 1D:
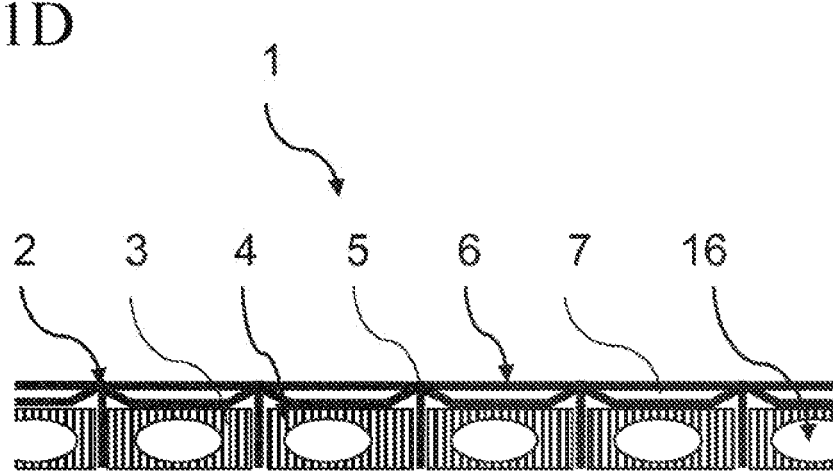
FIG. 1D shows a side view of a fourth embodiment of an add-on element according to the invention.

A fourth embodiment of an add-on element 1 according to the invention is depicted schematically in a side view in FIG. 1D. The fourth embodiment differs from the first embodiment in particular in a formation of the basic body 2 and thus an arrangement of the receiving regions 3 and therefore also an arrangement of the actuator bodies 3. The basic body 2 is formed like a comb, the receiving regions 4 being arranged to be distributed uniformly beside one another and open in the same direction. Such a formation is particularly suitable for functional components which are intended to have a particularly great deformability in one direction, such as flaps of storage compartments, armrests, consoles and console panels or the like. Provision can be made for the fourth embodiment to have a matrix material M (cf. FIG. 2E), in which the basic body is embedded with the actuator bodies.

Figure 2A:
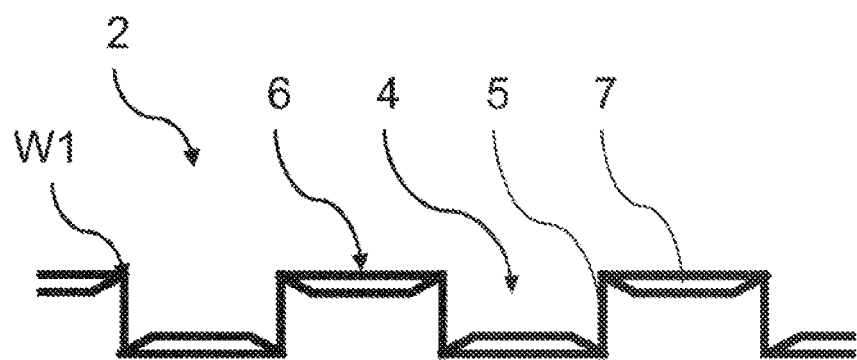
FIG. 2A shows a side view of a first state during the performance of the method according to the invention.

A first state during the performance of the method according to the invention is illustrated schematically in a side view in FIG. 2A. A basic body 2 made of a first material W1 is depicted. The basic body 2 has a cross section with a rectangular profile. Furthermore, the basic body 2 has receiving walls 5 and functional walls 6, wherein a receiving region 4 is bounded in three directions by respectively two receiving walls 5 and a functional wall 6. The receiving regions 4 are open in a direction pointing away from the functional wall 6. The functional walls 6 have a trapezoidal cross section, a short side facing the receiving region 4 and a long side facing away from the receiving region 4. Such a basic body 2 is, for example, produced in an injection molding process or 3-D printing process.

Figure 2B:
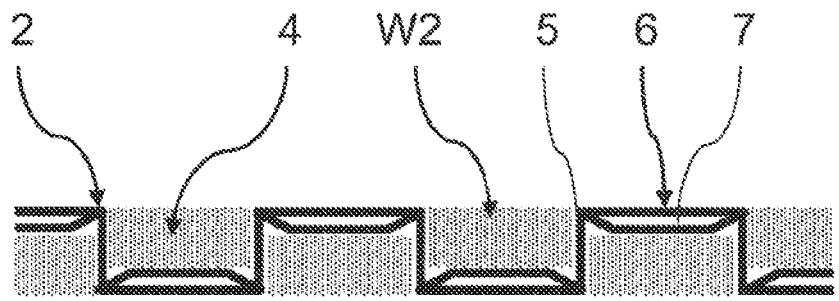
FIG. 2B shows a side view of a second state during the performance of the method according to the invention.

A second state during the performance of the method according to the invention is illustrated schematically in a side view in FIG. 2B. A free-flowing second material W2 has been introduced into the receiving regions 4 of the basic body 2.

Figure 2C:
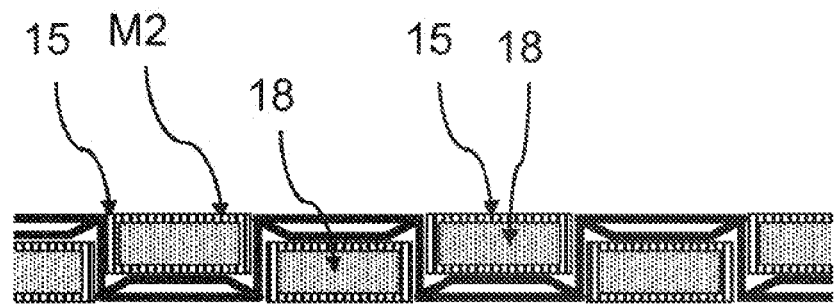
FIG. 2C shows a side view of a third state during the performance of the method according to the invention.

A third state during the performance of the method according to the invention is illustrated schematically in a side view in FIG. 2C. Edge zones 15 of the second material W2 have been solidified or at least substantially solidified and are thus no longer free-flowing or at least considerably more poorly free-flowing than the second material W2 in a central zone 18. Provision can be made that, as a result of the solidification, an attachment, in particular an adhesive attachment, is achieved between the second material W2 and the basic body 2. An adhesive modification, in particular of the second material W2, can be provided.

Figure 2D:
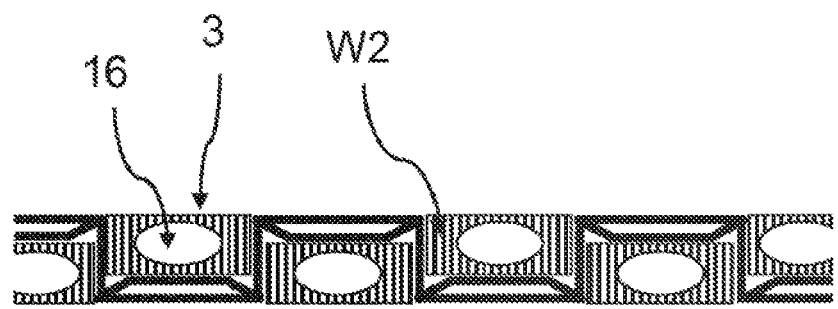
FIG. 2D shows a side view of a fourth state during the performance of the method according to the invention.

A fourth state during the performance of the method according to the invention is illustrated schematically in a side view in FIG. 2D. At least parts of the second material W2 have been removed from the central zone 18 (cf. FIG. 2C); in this way a continuous cavity 16 has been produced, which is preferably formed substantially in a center of the cross section of the actuator body 3, in order to reduce the risk of damage to the actuator body 3 on account of high internal pressures within the cavity 16.

Figure 2E:
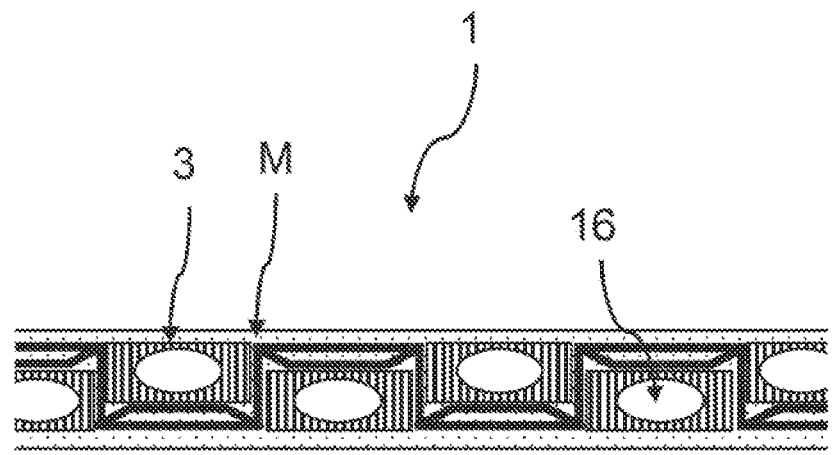
FIG. 2E shows a side view of a fifth state during the performance of the method according to the invention.

A fifth state during the performance of the method according to the invention is illustrated schematically in a side view in FIG. 2E. In the fifth state, the add-on element 1 has been finished. The basic body 2 concealing the actuator bodies 3 is embedded in a matrix material M, which surrounds said basic body and the actuator bodies 3 completely. As an alternative to a matrix material M or in addition, layers or films can also be applied to one or two sides of the basic body 2 and thus each cover and seal the same on one side.

Figure 3:
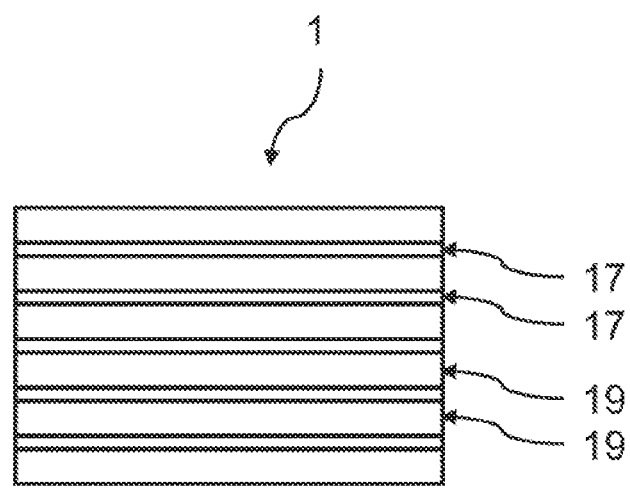
FIG. 3 shows a plan view of a specific configuration of the add-on element.

A specific configuration of the add-on element 1 according to the invention is illustrated schematically in a plan view in FIG. 3. The add-on element 1 is formed as a ventilation grille. Slots 17 are formed between individual slats 19. As a result of acting on the add-on element 1 and/or specific actuator bodies 3 of the add-on element 1, the slats 19 are deformable or movable, and thus the slots 17 are likewise variable. An air stream flowing onto ventilation grilles can thus, for example, be led through the ventilation grille, deflected or stopped by closing the slots 17.

Figure 4:
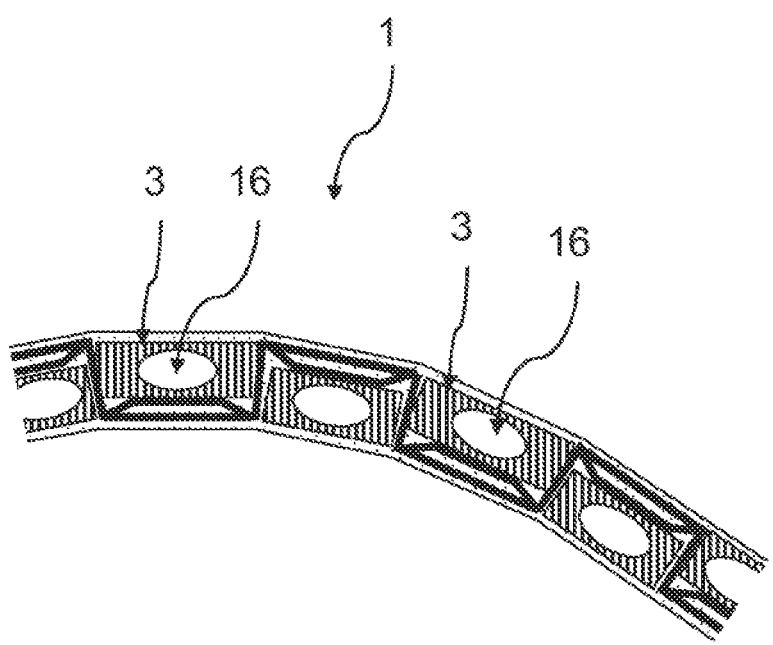
FIG. 4 shows a side view of a deformed add-on element.

FIG. 4 shows a deformed add-on element 1 according to the invention. The cavities 17 of specific actuator bodies 3 have an actuator source, such as compressed air, applied to them specifically, and the actuator bodies 3 are expanded laterally as a result. In this example, the add-on element 1 is bent slightly at two points in this way. Of course, it is also possible to bend the add-on element 1 in an opposite direction at this or other points in this way. Thus, very complex deformations of the add-on element 1 are achievable.

Figure 5:
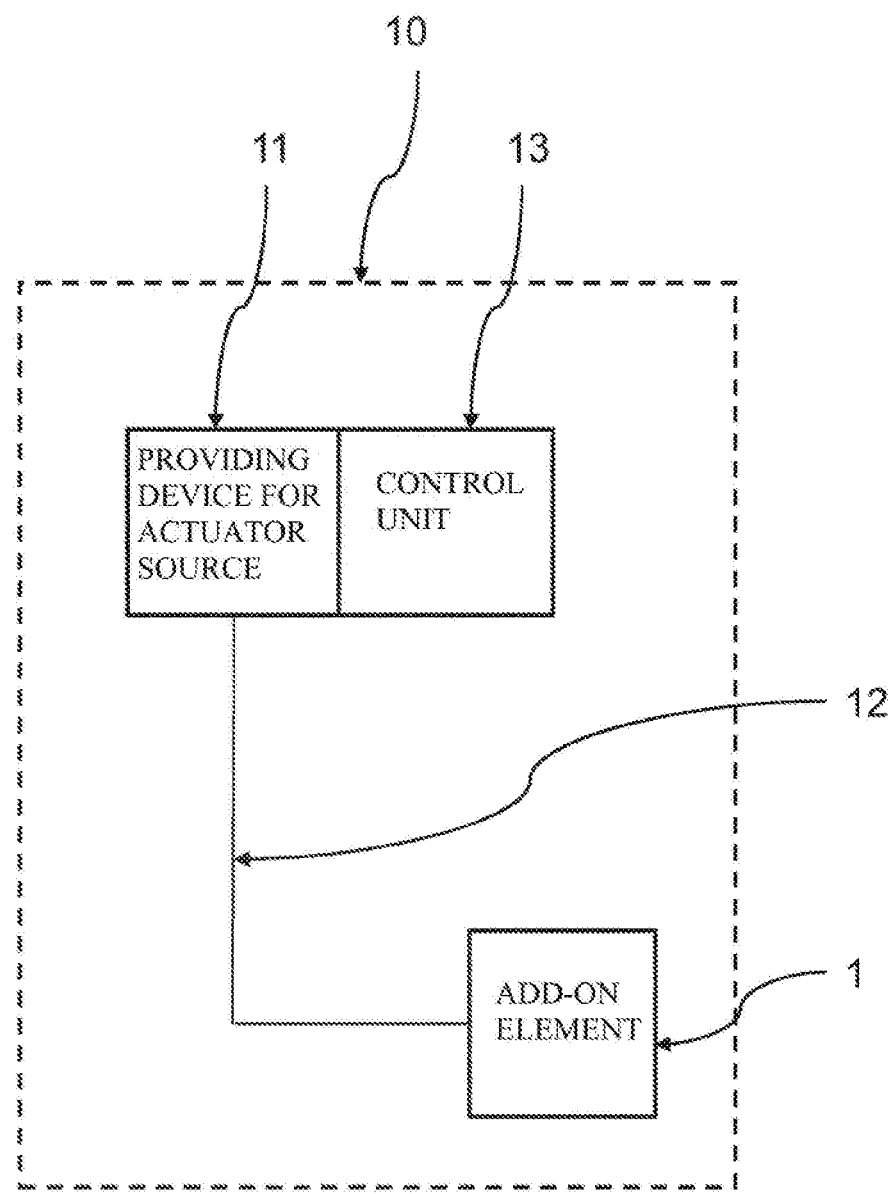
FIG. 5 shows a system according to the invention.

A system 10 according to the invention is illustrated schematically in FIG. 5. The system 10 for an interior of a motor vehicle has an add-on element 1 according to the invention which, via a line element 12 of the system 10, such as a pressure line, is coupled in a communicating, in particular fluid-communicating, manner to a providing device 11 of the system 10 for providing the actuator source. The providing device 11 and thus the provision of the actuator source is controllable via a control unit 13 of the system 10. According to the invention, controlling can comprise open-loop and/or closed-loop control. For the purpose of closed-loop control, the system 10 can have sensors or detectors, not shown, which are designed, for example, to measure the pressures in the receiving regions 14 and/or the cavities 16 or to measure expansions and/or to detect the position in space of the add-on element 1.

LIST OF DESIGNATIONS

1 Add-on element
2 Basic body
3 Actuator body
4 Receiving region
5 Receiving wall
6 Functional wall
7 Hollow space
10 System
11 Providing device
12 Line element
13 Control unit
14 Operating element
15 Edge zone
16 Cavity
17 Slot
18 Central zone
19 Slat
M Matrix material
W1 First material
W2 Second material The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A system of an interior of a motor vehicle, comprising:
an add-on element, wherein the add-on element comprises:
  a basic body made of a first material;
  at least one actuator body made of a second material, wherein
  the at least one actuator body is reversibly deformable by applying an actuator source,
  the basic body has at least one receiving region having a receiving region shape,
  the at least one actuator body is arranged in the at least one receiving region, the receiving region shape of the at least one receiving region is changed as a result of a shape change of the at least one actuator body; and the add-on element is a design element relating to design of the interior of the motor vehicle; and an interior component of the motor vehicle, wherein the interior component is disposed in the interior of the motor vehicle and wherein the add-on element is disposed on a surface of the interior component of the motor vehicle.

2. The system as claimed in claim 1, wherein
the basic body has a plurality of receiving regions, and
the receiving regions in one section of the basic body are formed at least on two different sides of the basic body.

3. The system as claimed in claim 1, wherein
the basic body has a wave-shaped cross section, at least in some areas.

4. The system as claimed in claim 1, wherein
the basic body has a plurality of receiving regions, and
the receiving regions in one section of the basic body are formed substantially on a same side of the basic body.

5. The system as claimed in claim 4, wherein
the basic body has a comb-shaped cross section, at least in some areas.

6. The system as claimed in claim 1, wherein
the at least one receiving region has receiving walls and at least one functional wall formed differently from the receiving walls.

7. The system as claimed in claim 6, wherein
the functional wall has a hollow space.

8. The system as claimed in claim 7, wherein
the hollow space has a rectangular, trapezoidal or oval cross section.

9. The system as claimed in claim 1, wherein
electric current or a pressurized fluid provide the actuator source.

10. The system as claimed in claim 9, wherein
the actuator source is compressed air.

11. The system as claimed in claim 9, wherein
the actuator body is a closed body and has at least one interface for a flow of the pressurized fluid into and/or out of the actuator body.

12. The system as claimed in claim 1, wherein
the first material has a higher stiffness than the second material.

13. The system as claimed in claim 1 further comprising:
a providing device for providing the actuator source;
at least one line element for guiding the actuator source between the providing device and the at least one add-on element, and
a control unit for open-loop and/or closed-loop control of the providing device.

14. The system as claimed in claim 13, wherein
the system has at least one operating element for operating the control unit.

15. A method for forming an interior of a motor vehicle, comprising the steps of:
producing an add-on element, the add-on element having a basic body made of a first material, and at least one actuator body made of a second material, wherein the at least one actuator body is reversibly deformable by applying an actuator source, wherein the basic body has at least one receiving region having a receiving region shape, wherein the at least one actuator body is arranged in the at least one receiving region, and wherein the receiving region shape of the at least one receiving region is changed as a result of a shape change of the at least one actuator body, producing the basic body from the first material, wherein the basic body has the at least one receiving region with receiving walls;

introducing a free-flowing second material into the at least one receiving region to produce the actuator body made of the second material; and solidifying edge zones of the second material, wherein the add-on element is a design element relating to design of the interior of the motor vehicle; and disposing the add-on element on a surface of an interior component of the motor vehicle, wherein the interior component is disposed in the interior of the motor vehicle.

16. The method as claimed in claim 15, wherein
at least part of the free-flowing second material is driven out of the receiving region such that at least one continuous cavity surrounded by the solidified edge zones is formed, the expulsion being carried out by a pressurized fluid and/or by way a dissolved propellant.

* * * * *